Patented June 25, 1935

2,006,162

UNITED STATES PATENT OFFICE 2,006,162

GRINDING COMPOSITION

Herman C. Fuchs, Brooklyn, N. Y., assignor to Permatex Company, Inc., Brooklyn, N. Y., a corporation of New York No Drawing. Application July 25, 1934, Serial No. 736,905

12 Claims. (Cl. 51—280)

My invention relates to abrasives and refers particularly to compositions of this character adapted for the grinding of engine valves of iron, steel, hardened steel and other materials, and similar objects.

An effective valve grinding composition must contain an abrasive in combination with some ingredient which will retain it upon the surface during the grinding operation, which will allow of abrasive contact between the abrasive and the object to be ground, which will not allow of the settling or separation of the abrasive from the carrying ingredient upon standing, which will not freeze at ordinary freezing temperatures, or be affected by temperatures below freezing and which will have a tendency to prevent, or retard, rusting of the valve surfaces.

Many attempts have been made to produce a valve grinding composition which will have the above necessary attributes for use upon iron, steel, hardened steel and other materials, valves, but they have not successfully met the needed requirements.

In a simple mixture of an abrasive and water, the abrasive is in intimate contact with the grinding surface, but the abrasive separates from the water, it freezes at ordinary freezing temperatures and it runs off the grinding surfaces.

The use of petrolatum and similar products is not efficient as the greasy, or oily, nature of the ingredient prevents proper abrasive results.

The use of starch or gum in water has been suggested to retain the abrasive in suspension but such mixtures have a tendency to rust the valve surfaces and they do not remain of uniform consistency over a period of time.

The use of colloidal clays such as bentonite has been attempted, but these compositions lose their viscosities upon freezing, the water present rusts the valve surfaces and they have a tendency to break down and separate.

The grinding composition of my invention possesses all the valuable properties mentioned above and presents an efficient and stable composition for the purposes mentioned.

I have found that the presence of glycollic compounds in grinding compositions containing Bentonite and water imparts most valuable grinding properties to the mixture and results in the production of a most superior composition for the purposes mentioned.

The high boiling points of the glycollic compounds prevent their evaporation; their low freezing points prevent the composition from freezing at ordinary freezing temperatures; they maintain the composition upon the grinding surfaces; they prevent the composition from breaking down at low temperatures; they maintain the abrasive in suspension, and possess other valuable properties when used in grinding compositions as herein described.

While the glycollic compounds impart the above mentioned valuable properties to a composition consisting of bentonite and water, I prefer to use them in compositions of bentonite and water with an oil and magnesium oxide either alone or together.

Among the glycollic compounds which I have found as suitable in the grinding compositions of my invention, are ethylene glycol, diethylene glycol, triethylene glycol, propylene glycol, and their alkyl ethers such as mono-ethyl-ether of ethylene glycol, butyl-ethyl-ether of ethylene glycol, mono-ethyl ether of diethylene glycol and butyl-ethyl-ether of diethylene glycol.

I give the following as examples of my invention:

Example 1

| | Pounds |
|---|---|
| Bentonite | 20 |
| Water | 158 |
| Abrasive | 160 |
| Ethylene or diethylene glycol | 47 |

Example 2

| | Pounds |
|---|---|
| Bentonite | 20 |
| Water | 158 |
| Abrasive | 160 |
| Ethylene or diethylene glycol | 47 |
| Mineral of vegetable oil | 10 |

Example 3

| | Pounds |
|---|---|
| Bentonite | 15 |
| Magnesium oxide | .15 |
| Water | 158 |
| Abrasive | 160 |
| Ehtylene or diethylene glycol | 47 |

Example 4

| | Pounds |
|---|---|
| Bentonite | 15 |
| Magnesium oxide | .15 |
| Water | 158 |
| Abrasive | 160 |
| Ehtylene or diethylene glycol | 47 |
| Mineral or vegetable oil | 10 |

The glycollic compounds mentioned in the above examples can be substituted by other glycollic compounds with the production of valuable grinding compositions and are within the scope of my invention.

I do not limit myself to the particular chemicals, quantities or steps of procedure specifically mentioned, as these are given simply for the purpose of clearly describing my invention.

What I claim is:—

1. A paste-like grinding composition containing bentonite, water, an abrasive and a glycollic compound.

2. A paste-like grinding composition containing bentonite, water, an abrasive and an alkyl glycol.

3. A paste-like grinding composition containing bentonite, water, an abrasive and ethylene glycol.

4. A paste-like grinding composition containing bentonite, water, an oil, an abrasive and a glycollic compound.

5. A paste-like grinding composition containing bentonite, water, an oil, an abrasve and an alkyl glycol.

6. A paste-like grinding composition containing bentonite, water, an oil, an abrasive, and ethylene glycol.

7. A paste-like grinding composition containing bentonite, water, magnesium oxide, an abrasive and a glycollic compound.

8. A paste-like grinding composition containing bentonite, water, magnesium oxide, an abrasive and an alkyl glycol.

9. A paste-like grinding composition containing bentonite, water, magnesium oxide, an abrasive, and ethylene glycol.

10. A paste-like grinding composition containing bentonite, water, an oil, magnesium oxide, an abrasive and a glycollic compound.

11. A paste-like grinding composition containing bentonite, water, an oil, magnesium oxide, an abrasive and an alkyl glycol.

12. A paste-like grinding composition containing bentonite, water, an oil, magnesium oxide, an abrasive and ethylene glycol.

HERMAN C. FUCHS.